Figure 1:
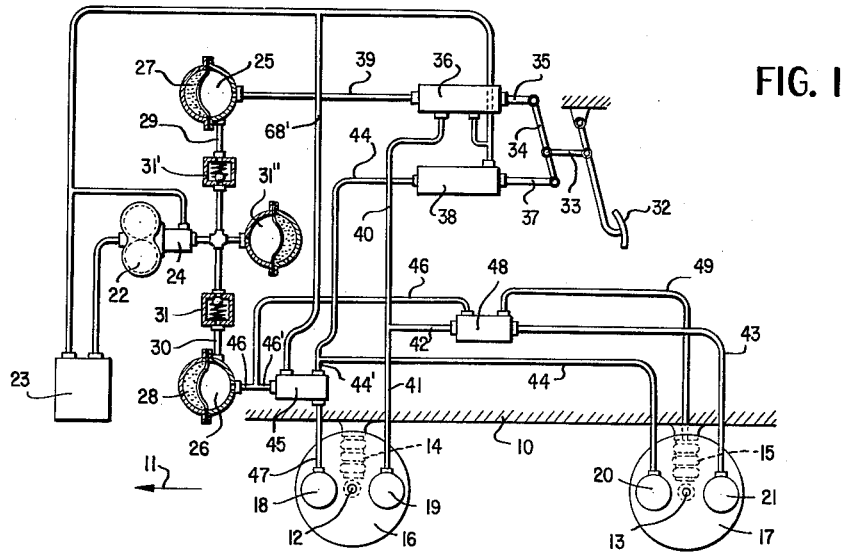

Sept. 7, 1965  F. H. VAN WINSEN ETAL  3,205,018

LOAD MODULATED DUAL BRAKE CONTROL SYSTEM

Filed May 7, 1962

INVENTORS.
FRIEDRICH H. VAN WINSEN
KLAUS BAUER
BY *Dicke and Craig*

ATTORNEYS.

# United States Patent Office 3,205,018
Patented Sept. 7, 1965

3,205,018
LOAD MODULATED DUAL BRAKE CONTROL SYSTEM
Friedrich H. Van Winsen, Kirchheim, Teck, and Klaus Bauer, Stuttgart-Unterturkheim, Germany, assignors to Daimler-Benz Aktiengesellschaft, Stuttgart-Unterturkheim, Germany
Filed May 7, 1962, Ser. No. 192,788
Claims priority, application Germany, May 12, 1961, D 36,054
18 Claims. (Cl. 303—6)

The present invention relates to a brake installation for vehicles, particularly motor vehicles, and consists essentially in that the brake-actuating member, for instance the brake pedal, acts on a scale-beam-like member which is connected, on the one hand, with a brake valve for the controlled transmittal of a servo-pressure stored in a tank or reservoir to a first system of wheel brakes and, on the other, with a hydraulic master brake cylinder for the transmittal of the actuating force to a second system of wheel brakes, whereby each wheel is preferably provided with brake cylinders of both systems.

A servo-brake mechanism is produced by such an arrangement which allows an instantaneous braking notwithstanding failure of the servo-brake system, namely in the conventional, direct, hydraulic manner. A further advantageous feature of such an arrangement in accordance with the instant invention resides in the fact that braking will take place without requiring any special action on the part of the driver. It is only necessary for the driver under those conditions to press down on the brake pedal a little more strongly than normally, which, however, he would do automatically in any event whenever the braking effect is not deemed sufficient by him.

It is advisable to so arrange and construct the installation according to the present invention that the brake valve is directly connected both with the front wheel brake cylinders and with the rear wheel brake cylinders of the first brake system, while the master brake cylinder is directly connected only with the brake cylinders of the second system of one of the wheel groups, for example, of the rear wheels, and actuates with the brake pressure thus produced an auxiliary control valve which transmits in a controlled manner the pressure of a second reservoir or storage tank to the brake cylinders, associated with the second system, of the other wheel group, for instance, of the front wheels. Since, for actuating the auxiliary control valve, only a very small volume of hydraulic medium needs to be displaced within the master cylinder, only about half of the displacement volume in the master brake cylinder suffices in such an installation, with equal braking effect, as compared to an installation in which the brake cylinders of one circuit on all four wheels are directly loaded or acted upon by the hydraulic medium displaced in the master cylinder. A smaller displacement volume in the master cylinder signifies, however, with the same pedal path and the same foot pressure, a small piston diameter and therewith a higher braking pressure. In the interest of keeping the actuating path of the auxiliary control valve small, the latter is best constructed in such a manner that it consists essentially of a piston slide valve which regulates, respectively, the supply and discharge of the pressure medium derived from the second storage tank or reservoir into and out of a space located ahead of one end face of the piston slide valve, which space communicates with the brake cylinders of the front wheels, whereas the other end face of the piston slide valve is loaded by the pressure medium coming from the master brake cylinder.

During braking, the rear axle is continuously relieved of load and the front axle is correspondingly loaded with an increasing brake force, i.e., with increasing brake pressure in the wheel brake cylinders, and thus with increasing deceleration of the vehicle. Theoretically, the distribution of the brake force to the rear and front wheels should change correspondingly. An approximation, however, which, in many cases, is sufficient for practical purposes results if the brake force of the rear wheels is made to increase less strongly beginning with a predetermined brake force. This may be achieved by the fact that the brake pressure for the rear wheels is then no longer permitted to increase at all in one of the brake systems. Accordingly, it is proposed, in accordance with the present invention, to install or interconnect in one of the brake systems, preferably in the first one, cooperating with the brake valve, a preferably adjustable pressure-limiting valve in the conduit or line leading to the brake cylinders of the rear wheels.

The more the rear axle is statically loaded, the larger the decelerations at which the relative decrease of the rear axle brake force will only become necessary so that it is advisable to adjust the maximum pressure, which is determined by the pressure-limiting valve, automatically to a higher value with an increasing static load of the rear axle. The pressure in the pneumatic springs of the rear wheels may, for example, be used appropriately for that purpose. It is proposed in particular to regulate or control the shut-off or closure in the pressure-limiting valve by means of a piston slide valve which is acted upon or loaded in the closing direction by the hydraulic pressure in the line leading to the brake cylinders of the rear wheels and, in the opening direction, by the pneumatic pressure in the line leading to the pneumatic springs of the rear wheels.

It might also possibly happen that, due to a damage or the like, the auxiliary control valve for braking the front wheels, which is controlled by the master brake cylinder, does not receive any pressure medium from the second pressure storage tank or reservoir so that, consequently, this braking action of the front wheels would be unavailable. In that case, in the absence of special means, the front wheels would be serviced only by one brake system, while the rear wheels would continue to be acted upon by both systems. Such a distribution of the brake pressure would be dangerous. Care must be taken, therefore, that in this case the rear wheels are also acted upon by one system only. Consequently, it is proposed, in accordance with the present invention, that in one of the brake systems, preferably in the first one which cooperates with the brake valve, a shut-off or gate valve is installed in the line leading to the brake cylinders of the rear wheels, which shut-off valve will automatically close when there is a pressure deficiency in the line between the second pressure storage tank or reservoir and the auxiliary control valve. The shut-off valve may be so constructed that the shut-off action thereof is regulated by a piston slide valve member which, in the open position thereof, is pressed against a stop or abutment by the pressure prevailing in the line between the second pressure storage tank or reservoir and the auxiliary control valve and which is loaded, in the closing direction thereof, by the pressure in the line leading to the brake cylinders of the rear wheels. It is preferable to combine structurally the shut-off valve and the pressure-limiting valve, for instance, in such a manner that both valves cooperate with the same disabling or disconnecting element, for example, with a single ball-type check valve. The arrangement may thereby be made in such a manner that the piston slide valve members of the pressure-limiting valve and of the shut-off valve are arranged axially one behind the other, that the hydraulic medium passes from the brake valve via the hollow piston slide valve member of the shut-off valve and via a ball-type check valve arranged within that piston slide valve and subject to spring pressure through a discharge aperture of this slide valve member located at the end face thereof into the space between the two piston slide valve members from which branches off the line leading to the brake cylinders of the rear wheels, and that the check valve, under normal conditions of operational readiness of the brake installation, is retained in the opening position thereof below the maximum pressure determined by the pressure-limiting valve against the spring force by means of a pin provided at the piston slide valve member of the pressure-limiting valve.

Accordingly, it is an object of the present invention to provide a brake system of the type described hereinabove which is reliable in operation and effectively eliminates the drawbacks encountered with the prior art devices.

It is another object of the present invention to provide a brake installation for vehicles, particularly motor vehicles, which comprises two brake systems and in which means are provided to effectively apportion the brake force to the different axles to assure safety in the deceleration of the wheels.

Still a further object of the present invention resides in the provision of safety means for a dual brake installation for vehicles which effectively prevents application of a braking force to the rear wheels in the absence of an equivalent braking force applied to the front wheels.

A further object is the provision of a brake installation for motor vehicles having two brake systems associated with each wheel in which the braking force is controllably distributed to the respective axles in dependence on the static load of the vehicle.

A further object of the present invention resides in the provision of a dual brake installation system of the type described hereinabove which is simple in operation and does not require of the driver any special deliberations in the operation thereof.

Figure 2:
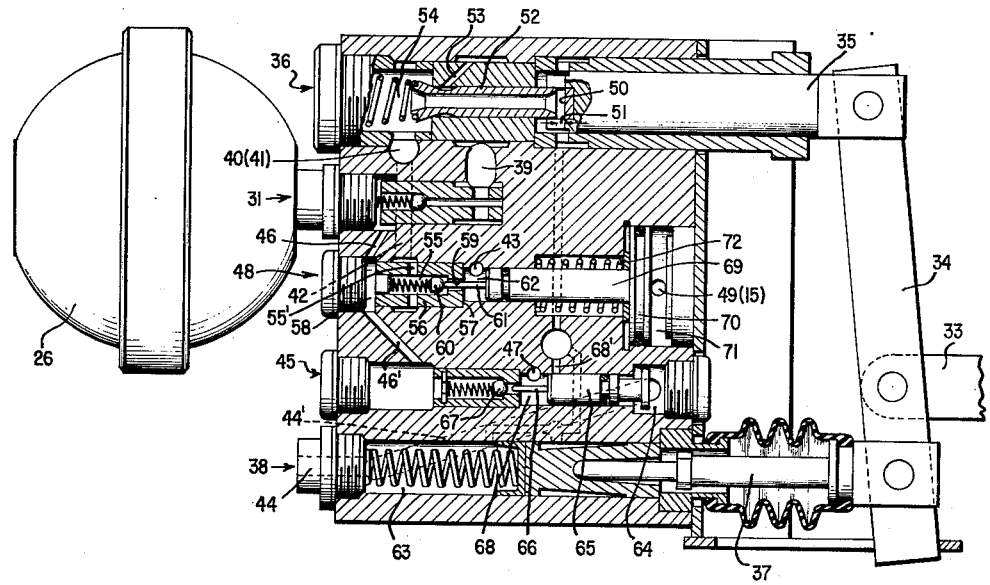

These and further objects, features and advantages of the present invention will become more obvious from the following description when taken in connection with the accompanying drawing which shows, for purposes of illustration only, one embodiment in accordance with the present invention, and wherein FIGURE 1 is a schematic view of the control system of the overall brake installation in accordance with the present invention, and FIGURE 2 is a cross-sectional view through the control block of the brake installation of FIGURE 1.

Referring now to the drawing wherein like reference numerals are used throughout the two views to designate like parts, and more particularly to FIGURE 1, reference numeral 10 designates therein a relatively fixed frame part of a passenger motor vehicle which normally drives in the direction of the arrow 11. For purposes of clarity, only the brakes, springs, etc. of one side of the vehicle have been shown in the drawing, the other side being identical. The front axle 12 and the rear axle 13, which may be of any known construction, are supported against the frame part 10 by means of pneumatic springs 14 and 15. Reference numerals 16 and 17 designate the parts of the wheel brakes which are rigidly connected with the wheels, i.e., for example, the disks of disk brakes. The wheel brake cylinders of the front wheel are designated by reference numerals 18 and 19, while those of the rear wheels are designated by reference numerals 20 and 21. Each of the wheel brake cylinders acts upon a conventional braking member, for instance, upon the jaws of a disk brake.

An oil pump 22 driven by the vehicle engine draws in oil from a reservoir or tank 23 and supplies through storage tank or reservoir supply valve 24 a first pressure storage tank or reservoir 25 and a second pressure storage tank or reservoir 26, in which the oil is under the pressure of a compressed gas volume 27 and 28, respectively. Check valves 31 and 31' as well as an intermediate pressure storage tank or reservoir 31" may be installed in the feed lines 29 and 30 to tanks or reservoirs 25 and 26.

The brake pedal is operatively connected by means of a connecting rod 33 with a scale-beam-like member 34. One free end of the scale-beam like member 34 is pivotally connected to the actuating rod 35 of a brake valve 36 while the other free end of the scale-beam-like member 34 is pivotally connected to the actuating rod 37 of a master brake cylinder 38. The brake valve 36 controllably valves the pressure medium, which has been supplied in a manner, known per se, from the tank or reservoir 25 via conduit 39 for further transmission through lines 40, 41, 42 and 43 to the wheel brake cylinders 19 and 21. The pressure medium present in lines 44 and 44', by means of which the wheel brake cylinder 20 as well as the auxiliary control valve 45 are loaded, is placed under pressure by the master cylinder 38.

The auxiliary control valve 45 controllably valves and therewith controllably transmits the pressure medium supplied from the storage tank or reservoir 26 via conduits 46 and 46' through a line 47 to the wheel brake cylinder 18.

There is arranged within the line branch 42, 43 leading to the brake wheel cylinder 21 a pressure-limiting and shut-off valve 48 which limits the pressure in line 43 to a predetermined maximum value. The magnitude of this maximum value is automatically adjusted in dependence on the pressure in the pneumatic spring 15; for that purpose, a connecting line 49 is necessary between the pneumatic spring 15 and valve 48. The shut-off portion of valve 48 is actuated through the conduit 46, as will appear more fully hereinafter.

FIGURE 2 illustrates how the essential control elements of the brake installation according to the present invention are structurally combined in a single block. Going in the downward direction, there are arranged in FIGURE 2 the brake valve generally designated in this figure by reference numeral 36, the check valve generally designated in this figure by reference numeral 31, the shut-off or gate and pressure-limiting valve generally designated in this figure by reference numeral 48, the auxiliary control valve generally designated in this figure by reference numeral 45 and the master brake cylinder generally designated in this figure by reference numeral 38.

The structure of the various control elements of FIGURE 2 may best be explained on the basis of an explanation of the operation of the installation in accordance with the present invention:

During a normal braking operation and with an installation under regular operating readiness, the force transmitted through the rod 33 upon depressing the brake pedal 32, is distributed via the scale-beam-member 34 to the actuating rods 35 and 37.

After passing through the lost-motion path 51, the actuating rod 35 with the end face 50 thereof displaces a valve body 52 toward the left, as viewed in FIGURE 2, so that the pressure oil coming from the storage tank or reservoir 25 is able to reach the space 54 through the line or conduit 39 and channel 53. Pressure will now build up in space 54 which seeks to push the valve body 52 back toward the right which occurs when this pressure force is greater than the force transmitted from the foot to the rod 35. The pressure prevailing in space 54 also acts upon the wheel brake cylinder 19 which is connected with space 54 through conduits or lines 40 and 41. Furthermore, this pressure will reach the closing part of valve 48 through conduit or line 42. More particularly, flowing through line 42, the pressure medium enters through a cross bore 55' the hollow space 55 of a piston slide valve member 56. This piston slide valve member 56 is pressed toward the right against a stop 57 by a pressure existing at the left end face thereof in space 58. The pressure in space 58 is derived from pressure storage tank or reservoir 26 which is in communication with the space 58 through the channel 46. The slide valve member 56 is provided with an axial outlet or discharge aperture 59 which is adapted to be shut-off or closed by a spring-loaded ball 60. However, in the illustrated position, the discharge aperture 59 is kept open by means of a pin 61. Consequently, the pressure medium in hollow space 55 is thus also able to reach space 62 whence it reaches the brake cylinder 21 of the rear wheel through the line 43. Accordingly, the wheel brake cylinders 19 and 21 of the first brake system, which is controlled by the brake valve 36, are uniformly or evenly loaded with pressure.

The actuating rod 37 produces in a manner, known per se, a brake pressure within the pressure space 63 of the master cylinder 38, which brake pressure, on the one hand, reaches the wheel brake cylinder 20 of the rear wheel through line 44 and, on the other, reaches through channel 44' a space 64 in which it loads or acts upon a piston slide valve member 65 that is displaced by this brake pressure from master cylinder 38 toward the left, as viewed in FIGURE 2. As a result of such displacement toward the left, a pin 66 secured at the piston slide valve member 65 opens a ball-type check valve 67 thereby opening a passage to the pressure medium flowing from pressure storage tank or reservoir 26 through lines 46 and 46' into a space 68 from which the pressure medium may reach through line 47 the brake cylinder 18 of the front wheel and through a discharge 68' controlled by the slide valve member 65 may flow back to the tank 23. The auxiliary control valve 45 is so constructed and dimensioned that there corresponds to the pressure in line 44 an approximately equally large pressure in line 47. Accordingly, the wheel brake cylinders 18 and 20 of the second brake system are also loaded uniformly or evenly with pressure.

In case of a more intense braking, i.e., when the pressure in line 43 and in the rear-wheel brake cylinder 21 seeks to exceed a certain value, a piston slide valve member 69 connected with a piston 70 is displaced toward the right by the same pressure then also existing in space 62. Piston 70 is subjected to the air pressure in space 71 which is, in every case, equal to the pressure prevailing in the pneumatic spring 15 of the rear wheel, since the pneumatic spring 15 and space 71 are interconnected through line 49. The piston slide valve member 69 will, therefore, move toward the right when the force exerted thereon by the hydraulic pressure in space 62 is greater than the oppositely directed force exerted thereon by the air pressure in space 71. The greater the static spring load on the rear wheels, i.e., the higher the pressure in space 71, the greater must be the pressure in line 43 and in space 62 before the piston slide valve member 69 will move toward the right. A compression spring 72 serves for the desired matching between the air pressure and the hydraulic pressure. The insertion of this spring is necessary because the maximum pressures of the rear wheel brake, which are desired in each case, with different static loads of the rear axle have a different relationship to each other than the corresponding pressures in the pneumatic springs of the rear wheels. When the piston slide valve member 69 is displaced from the position illustrated in FIGURE 2 toward the right, then also the pin 61 which is secured to the piston slide valve member 69 will be displaced toward the right so that the ball-type check valve 60 is closed, whereby the pressure in space 62 and therewith also the pressure in the rear-wheel brake cylinder 21 cannot increase any further. The first brake system then acts by means of lines 40 and 41 on the front-wheel brake cylinders 19 with a pressure which corresponds to the force applied by the foot through the pedal 32, while the pressure in the rear brake cylinder 21 and in line 43 will not increase any further, even with an increase in the force applied by the driver's foot, but will remain constant at the respective cut-off pressure.

In case no pressure is available in storage tank or reservoir 26 or in the conduits and spaces directly connected therewith, by reason of an operating failure or damage, in which case also the auxiliary control valve 45 is no longer able to supply any pressure to the line 47 for the front-wheel brake cylinder 18, precautions are taken in accordance with the present invention that one of the two brake systems will also no longer be effective on the rear wheels as otherwise a dangerous braking action would occur on the rear wheels which is much too intense or strong in relation to the braking action at the front wheels. When pressure tank or reservoir 26 is without pressure, then lines 46 and 46' will also become pressureless, which has the consequence that the piston slide valve member 56 will be displaced toward the left, as viewed in FIGURE 2, by the pressure prevailing in space 62, whereby the ball 60 comes to lie in front of i.e., closes the discharge opening 59 and thereby prevents the flow of any pressure medium to line 43 and therewith to the rear-wheel brake cylinder 21. Consequently, only one brake cylinder each, namely cylinders 19 and 20, respectively, will be operative at the front wheel as well as at the rear wheel.

If pressure tank or reservoir 25 and the spaces connected therewith should become pressureless, then breaking will take place through the master brake cylinder 38 in conjunction with the auxiliary control valve 45, whereby again only one brake cylinder each, namely cylinders 18 and 20, will be effective at the front wheel and at the rear wheel.

Finally, in case both pressure tanks or reservoirs 25 and 26 become pressureless, then at least one wheel brake cylinder will still remain effective, namely the cylinder 20 at the rear wheel which is directly actuated from the master brake cylinder 38.

While we have shown and described one embodiment in accordance with the present invention, it is understood that the same is not limited thereto, but is susceptible of many changes and modifications within the spirit and scope thereof as known to a person skilled in the art we, therefore, do nots wish to be limited to the details shown and described herein, but intend to cover all such changes and modifications as are encompassed by the scope of the appended claims.

We claim:

1. A brake installation for vehicles, particularly motor vehicles, having a first and second brake system and brake cylinder means at each of the front and rear wheels associated with a respective one of both of said brake systems, comprising brake-actuating means including scale-beam means operatively connected therewith, first pressure-medium means operatively associated with said first brake system, second pressure-medium means operatively associated with said second brake system, brake valve means operatively connected with said first pressure-medium means, first connecting means directly and operatively connecting said brake valve means with the brake cylinder means of the front and rear wheels of said first brake system to controllably transmit the pressure medium from said first pressure-medium means to the wheel brake cylinder means of both the front and rear wheels of said first brake system, master cylinder means, said scale-beam means being operatively connected near the two ends thereof with said brake valve means and with said master cylinder means, second connecting means operatively connecting the second pressure-medium means with the brake cylinder means of only the front wheels of the second system including auxiliary valve means for selectively controlling the flow of the pressure medium in said second connecting means, and third connecting means operatively connecting said master cylinder means on the one hand, directly with the brake cylinder means of only the rear wheels of said second brake system to directly transmit the actuaing force produced in said master cylinder means to the brake cylinder means of only the rear wheels and, on the other, with said auxiliary valve means to selectively actuate said auxiliary valve means by the hydraulic pressure produced in said master cylinder means so as to transmit the pressure medium from said second pressure-medium means to the brake cylinder means of the front wheels of said second system in the presence of a predetermined magnitude of said hydraulic pressure.

2. A brake installation for vehicles, particularly motor vehicles, having a first and second brake system and brake cylinder means at each of the front and rear wheels associated with a respective one of both of said brake systems, comprising brake-actuating means including scale-beam means operatively connected therewith, first pressure-medium means operatively associated with said first brake system, second pressure-medium means operatively associated with said second brake system, brake valve means operatively connected with said first pressure-medium means, first connecting means directly and operatively connecting said brake valve means with the brake cylinder means of the front and rear wheels of said first brake system to controllably transmit the pressure medium from said first pressure-medium means to the wheel brake cylinder means of both the front and rear wheels of said first brake system, master cylinder means, said scale-beam means being operatively connected near the two ends thereof with said brake valve means and with said master cylinder means, second connecting means operatively connecting the second pressure-medium means with the brake cylinder means of only the front wheels of the second brake system including auxiliary valve means for selectively controlling the flow of the pressure medium in said second connecting means, and third connecting means operatively connecting said master cylinder means, on the one hand, directly with the brake cylinder means of only the rear wheels of said second brake system to directly transmit the actuating force produced in said master cylinder means to the brake cylinder means of only the rear wheels and, on the other, with said auxiliary valve means to selectively actuate said auxiliary valve means by the hydraulic pressure produced in said master cylinder means so as to transmit the pressure medium from said second pressure-medium means to the brake cylinder means of the front wheels of said second brake system in the presence of a predetermined magnitude of said hydraulic pressure, said auxiliary valve means including a piston slide valve member operable to control the supply and discharge of the pressure medium from said second pressure-medium means to and from a space disposed in front of one end face of said piston slide valve member, said last-mentioned space being in communication with the brake cylinder means of the front wheels of said second brake system, and the other end face of said piston slide valve member being acted upon by the hydraulic pressure medium derived from said master cylinder means.

3. A brake installation for vehicles, particularly motor vehicles, having a first and second brake system and brake cylinder means at each of the front and rear wheels associated with a respective one of both of said brake systems, comprising brake-actuating means including scale-beam means operatively connected therewith, first pressure-medium means operatively associated with said first brake system, second pressure-medium means operatively associated with said second brake system, brake valve means operatively connected with said first pressure-medium means, first connecting means directly and operatively connecting said brake valve means with the brake cylinder means of the front and rear wheels of said first brake system to controllably transmit the pressure medium from said first pressure-medium means to the wheel brake cylinder means of both the front and rear wheels of said first brake system including adjustable pressure limit valve means in the connection between said brake valve means and the brake cylinder means of the rear wheels of said first brake system for limiting the pressure of the pressure medium transmitted from said first pressure-medium means to said last-mentioned brake cylinder means, master cylinder means, said scale-beam means being operatively connected near the two ends thereof with said brake valve means and with said master cylinder means, second connecting means operatively connecting the second pressure-medium means with the brake cylinder means of only the front wheels of the second brake system including auxiliary valve means for selectively controlling the flow of the pressure medium in said second connecting means, and third connecting means operatively connecting said master cylinder means, on the one hand, directly with the brake cylinder means of only the rear wheels of said second brake system to directly transmit the actuating force produced in said master cylinder means to the brake cylinder means of only the rear wheels and, on the other, with said auxiliary valve means to selectively actuate said auxiliary valve means by the hydraulic pressure produced in said master cylinder means so as to transmit the pressure medium from said second pressure-medium means to the brake cylinder means of the front wheels of said second brake system in the presence of a predetermined magnitude of said hydraulic pressure, said auxiliary valve means including a piston slide valve member operable to control the supply and discharge of the pressure medium from said second pressure-medium means to and from a space disposed in front of one end face of said piston slide valve member, said last-mentioned space being in communication with the brake cylinder means of the front wheels of said second brake system, and the other end face of said piston slide valve member being acted upon by the hydraulic pressure medium derived from said master cylinder means.

4. A brake installation for vehicles, particularly motor vehicles, having a first and second brake system and brake cylinder means at each of the front and rear wheels associated with a respective one of both of said brake systems, comprising brake-actuating means including scale-beam means operatively connected therewith, first pressure-medium means operatively associated with said first brake system, second pressure-medium means operatively associated with said second brake system, brake valve means operatively connected with said first pressure-medium means, first connecting means directly and operatively connecting said brake valve means with the brake cylinder means of the front and rear wheels of said first brake system to controllably transmit the pressure medium from said first pressure-medium means to the wheel brake cylinder means of both the front and rear wheels of said first brake system including adjustable pressure limit valve means in the connection between said brake valve means and the brake cylinder means of the rear wheels of said first brake system for limiting the pressure of the pressure medium transmitted from said first pressure-medium means to said last-mentioned brake cylinder means, and means automatically adjusting the maximum pressure limit in said pressure limit valve means in response to the load on the rear wheels, master cylinder means, said scale-beam means being operatively connected near the two ends thereof with said brake valve means and with said master cylinder means, second connecting means operatively connecting the second pressure-medium means with the brake cylinder means of only the front wheels of the second brake system including auxiliary valve means for selectively controlling the flow of the pressure medium in said second connecting means, and third connecting means operatively connecting said master cylinder means, on the one hand, directly with the brake cylinder means of only the rear wheels of said second brake system to directly transmit the actuating force produced in said master cylinder means to the brake cylinder means of only the rear wheels and, on the other, with said auxiliary valve means to selectively actuate said auxiliary valve means by the hydraulic pressure produced in said master cylinder means so as to transmit the pressure medium from said second pressure-medium means to the brake cylinder means of the front wheels of said second brake system in the presence of a predetermined magnitude of said hydraulic pressure, said auxiliary valve means including a piston slide valve member operable to control the supply and discharge of the pressure medium from said second pressure-medium means to and from a space disposed in front of one end face of said piston slide valve member, said last-mentioned space being in communication with the brake cylinder means of the front wheels of said second brake system, and the other end face of said piston slide valve member being acted upon by the hydraulic pressure medium derived from said master cylinder means.

5. A brake installation for vehicles, particularly motor vehicles, having a first and second brake system and brake cylinder means at each of the front and rear wheels associated with a respective one of both of said brake systems, comprising brake-actuating means, first pressure-medium means providing a pressure medium associated with said first brake system, second pressure-medium means providing a pressure medium associated with said second brake system, brake valve means operatively connected with said first pressure-medium means, first means operatively connecting said brake valve means with the brake cylinder means of the front and rear wheels of said first brake system to controllably transmit the pressure medium from said first pressure-medium means to the wheel brake cylinder means of both the front and rear wheels of said first brake master cylinder means operatively connected with said actuating means, second means operatively connecting the second pressure-medium means with the brake cylinder means of only one group of wheels of the second brake system including auxiliary valve means for selectively controlling the flow of the pressure medium in said second connecting means, and third means operatively connecting said master cylinder means, on the one hand, directly with the brake cylinder means of only the other group of wheels of said second brake system to directly transmit thereto the actuating force produced in said master cylinder means and, on the other, with said auxiliary valve means to selectively actuate said auxiliary valve means by the hydraulic pressure produced in said master cylinder means so as to transmit the pressure medium from said second pressure medium means to the brake cylinder means of said one group of wheels in the presence of a hydraulic pressure produced by said master cylinder means.

6. A brake installation for vehicles, particularly motor vehicles, having a first and second brake system and brake cylinder means at each of the front and rear wheels associated with a respective one of both of said brake systems, comprising brake-actuating means, first pressure-medium means providing a pressure medium associated with said first brake system, second pressure medium means providing a pressure medium associated with said second brake system, brake valve means operatively connected with said first pressure-medium means, first means operatively connecting said brake valve means with the brake cylinder means of the front and rear wheels of said first brake system to controllably transmit the pressure medium from said first pressure-medium means to the wheel brake cylinder means of both the front and rear wheels of said first brake system including pressure limit valve means in the line leading to the brake cylinder means of the rear wheels, master cylinder means operatively connected with said actuating means, second means operatively connecting the second pressure-medium means with the brake cylinder means of only one group of wheels of the second brake system including auxiliary valve means for selectively controlling the flow of the pressure medium in said second connecting means, and third means operatively connecting said master cylinder means, on the one hand, directly with the brake cylinder means of only the other group of wheels of said second brake system to directly transmit thereto the actuating force produced in said master cylinder means and, on the other, with said auxiliary valve means to selectively actuate said auxiliary valve means by the hydraulic pressure produced in said master cylinder means so as to transmit the pressure medium from said second pressure-medium means to the brake cylinder means of said one group of wheels in the presence of a hydraulic pressure produced by said master cylinder means.

7. A brake installation for vehicles, particularly motor vehicles, having a first and second brake system and brake cylinder means at each of the front and rear wheels associated with a respective one of both of said brake systems, the wheels being mounted on axle means, comprising brake-actuating means, first pressure-medium means providing a pressure medium associated with said first brake system, second pressure-medium means providing a pressure medium associated with said second brake system, brake valve means operatively connected with said first pressure-medium means, first means operatively connecting said brake valve means with the brake cylinder means of the front and rear wheels of said first brake system to controllably transmit the pressure medium from said first pressure-medium means to the wheel brake cylinder means of both the front and rear wheels of said first brake system including pressure limit valve means in the line leading to brake cylinder means of the rear wheels, means for automatically adjusting the maximum pressure determined by said pressure limit valve means to a higher value with an increase in load of the rear axle means, master cylinder means operatively connected with said actuating means, second means operatively connecting the second pressure-medium means with the brake cylinder means of only one group of wheels of the second brake system including auxiliary valve means for selectively controlling the flow of the pressure medium in said second connecting means, and third means operatively connecting said master cylinder means, on the one hand, directly with the brake cylinder means of only the other group of wheels of said second brake system to directly transmit thereto the actuating force produced in said master cylinder means and, on the other, with said auxiliary valve means to selectively actuate said auxiliary valve means by the hydraulic pressure produced in said master cylinder means so as to transmit the pressure medium from said second pressure medium means to the brake cylinder means of said one group of wheels in the presence of a hydraulic pressure produced by said master cylinder means.

8. A brake installation for vehicles, particularly motor vehicles, having a first and second brake system and brake cylinder means at each of the front and rear wheels associated with a respective one of both of said brake systems, the wheels being mounted on axle means and spring-supported by pneumatic spring means, comprising brake-actuating means, first pressure-medium means providing a pressure medium associated with said first brake system, second pressure-medium means providing a pressure medium associated with said second brake system, brake valve means operatively connected with said first pressure-medium means, first means operatively connecting said brake valve means with the brake cylinder means of the front and rear wheels of said first brake system to controllably transmit the pressure medium from said first pressure-medium means to the wheel brake cylinder means of both the front and rear wheels of said first brake system including pressure limit valve means in the line leading to the brake cylinder means of the rear wheels, means for automatically adjusting the maximum pressure determined by said pressure limit valve means to a higher value with an increase in load of the rear axle means by the pressure prevailing in the pneumatic springs for the rear wheels, master cylinder means operatively connected with said actuating means, second means operatively connecting the second pressure-medium means with the brake cylinder means of only one group of wheels of the second brake system including auxiliary valve means for selectively controlling the flow of the pressure medium in said second connecting means, and third means operatively connecting said master cylinder means, on the one hand, directly with the brake cylinder means of only the other group of wheels of said second brake system to directly transmit thereto the actuating force produced in said master cylinder means and, on the other, with said auxiliary valve means to selectively actuate said auxiliary valve means by the hydraulic pressure produced in said master cylinder means so as to transmit the pressure medium from said second pressure-medium means to the brake cylinder means of said one group of wheels in the presence of a hydraulic pressure produced by said master cylinder means.

9. A brake installation for vehicles, particularly motor vehicles, having a first and second brake system and brake cylinder means at each of the front and rear wheels associated with a respective one of both of said brake systems, the wheels being mounted on axle means and spring-supported by pneumatic spring means, comprising brake-actuating means, first pressure-medium means providing a pressure medium associated with said first brake system, second pressure-medium means providing a pressure medium associated with said second brake system, brake valve means operatively connected with said first pressure-medium means, first means operatively connecting said brake valve means with the brake cylinder means of the front and rear wheels of said first brake system to controllably transmit the pressure medium from said first pressure-medium means to the wheel brake cylinder means of both the front and rear wheels of said first brake system including pressure limit valve means in the line leading to the brake cylinder means of the rear wheels, means for automatically adjusting the maximum pressure determined by said pressure limit valve means to a higher value with an increase in load of the rear axle means by the pressure prevailing in the pneumatic springs for the rear wheels including a piston slide valve member controlling said pressure limit valve means, said piston slide valve member being acted upon in the closing direction thereof by the pressure medium in the connection formed by said first means and leading to the brake cylinder means of the rear wheels of said first brake system and in the opening direction thereof by the pneumatic pressure in the line leading to the corresponding pneumatic spring means, master cylinder means operatively connected with said actuating means, second means operatively connecting the second pressure-medium means with the brake cylinder means of only one group of wheels of the second brake system including auxiliary valve means for selectively controlling the flow of the pressure medium in said second connecting means, and third means operatively connecting said master cylinder means, on the one hand, directly with the brake cylinder means of only the other group of wheels of said second brake system to directly transmit thereto the actuating force produced in said master cylinder means and, on the other, with said auxiliary valve means to selectively actuate said auxiliary valve means by the hydraulic pressure produced in said master cylinder means so as to transmit the pressure medium from said second pressure-medium means to the brake cylinder means of said one group of wheels in the presence of a hydraulic pressure produced by said master cylinder means.

10. In a brake installation for vehicles, particularly motor vehicles, which includes two brake systems, each brake system having brake cylinder means at each wheel of the vehicle, pressure-medium means effectively providing a pressure medium to said brake systems, brake valve means operatively associated with the brake cylinder means of the first brake system, master cylinder means hydraulically connected with the brake cylinder means of the second brake system, and actuating means operatively connected with said brake valve means and said master cylinder means, the improvement essentially consisting of first means operatively connecting said brake valve means between said pressure-medium means and the brake cylinder means of said first brake system in such a manner that said brake valve means upon actuation thereof by said actuating means controllably transmits the pressure medium from said pressure-medium means to the wheel brake cylinder means of said first brake system, second means operatively connecting said master cylinder means with the brake cylinder means of the second brake system to effectively transmit the actuating force in the form of a pressure medium produced within said master cylinder means hydraulically to the brake cylinder means of the second brake system, and pressure limit valve means in the connection leading to the rear wheels of said first brake system and responsive to the dynamic load over said rear wheels for effectively selectively limiting the pressure in said connection to a maximum value determined by the instantaneous dynamic load over said rear wheels.

11. A brake installation for vehicles, particularly motor vehicles, having a first and second brake system and brake cylinder means at each of the front and rear wheels associated with a respective one of both of said brake systems, comprising brake-actuating means, first pressure-medium means providing a pressure medium associated with said first brake system, second pressure medium means providing a pressure medium associated with said second brake system, brake valve means operatively connected with said first pressure medium means, first means operatively connecting said brake valve means with the brake cylinder means of the front and rear wheels of said first brake system to controllably transmit the pressure medium from said first pressure-medium means to the wheel brake cylinder means of both the front and rear wheels of said first brake system including shut-off valve means in the connection leading to the brake cylinder means of the rear wheels of said first brake system, master cylinder means operatively connected with said actuating means, second means operatively connecting the second pressure-medium means with the brake cylinder means of only one group of wheels of the second brake system including auxiliary valve means for selectively controlling the flow of the pressure medium in said second connecting means, means automatically controlling the closure of said shut-off valve means in the absence of a pressure medium in the connection between said second pressure medium means and said auxiliary valve means, and third means operatively connecting said master cylinder means, on the one hand, directly with the brake cylinder means of only the other group of wheels of said second brake system to directly transmit thereto the actuating force produced in said master cylinder means and, on the other, with said auxiliary valve means to selectively actuate by the hydraulic pressure produced in said master cylinder means said auxiliary valve means so as to transmit the pressure medium from said second pressure medium means to the brake cylinder means of said one group of wheels in the presence of a hydraulic pressure produced by said master cylinder means.

12. A brake installation for vehicles, particularly motor vehicles, having a first and second brake system and brake cylinder means at each of the front and rear wheels associated with a respective one of both of said brake systems, comprising brake-actuating means, first pressure-medium means providing a pressure medium associated with said first brake system, second pressure-medium means providing a pressure medium associated with said second brake system, brake valve means operatively connected with said first pressure medium means, first means operatively connecting said brake valve means with the brake cylinder means of the front and rear wheels of said first brake system to controllably transmit the pressure medium from said first pressure-medium means to the wheel brake cylinder means of both the front and rear wheels of said first brake system including shut-off valve means in the connection leading to the brake cylinder means of the rear wheels of said first brake system, master cylinder means operatively connected with said actuating means, second means operatively connecting the second pressure-medium means with the brake cylinder means of only one group of wheels of the second brake system including auxiliary valve means for selectively controlling the flow of the pressure medium in said second connecting means, means automatically controlling the closure of said shut-off valve means in the absence of a pressure medium in the connection between said second pressure medium means and said auxiliary valve means including a piston slide valve member which is pressed in the open position thereof against an abutment by the pressure medium in said last-mentioned connection and which is acted upon in the closing direction thereof by the pressure in the connection leading to the brake cylinder means of the rear wheels of said first brake system, and third means operatively connecting said master cylinder means, on the one hand, directly with the brake cylinder means of only the other group of wheels of said second brake system to directly transmit thereto the actuating force produced in said master cylinder means and, on the other, with said auxiliary valve means to selectively actuate said auxiliary valve means by the hydraulic pressure produced in said master cylinder means so as to transmit the pressure medium from said second pressure medium means to the brake cylinder means of said one group of wheels in the presence of a hydraulic pressure produced by said master cylinder means.

13. In a brake installation for vehicles, particularly motor vehicles, which includes two brake systems each having brake cylinder means at each wheel, pressure-medium means effectively providing a pressure medium and associated with said brake systems, brake valve means operatively associated with the brake cylinder means of the first brake system, master cylinder means hydraulically connected with the brake cylinder means of the second brake system, and actuating means operatively connected with said brake valve means and said master cylinder means, the improvement essentially consisting of first means operatively connecting said brake valve means with the brake cylinder means of said first brake system in such a manner that said brake valve means upon actuation thereof by said actuating means controllably transmits the pressure medium from said pressure medium means to the wheel brake cylinder means of said first brake system, second means operatively connecting said master cylinder means with the brake cylinder means of the second brake system to effectively transmit the actuating force in the form of a pressure medium produced within said master cylinder means hydraulically to the brake cylinder means of the second brake system, shut-off valve means in the connection of one of said brake systems leading to the brake cylinder means of the rear wheels thereof, and means for automatically closing said shut-off valve in the absence of a pressure medium from said pressure-medium means.

14. A brake installation for vehicles, particularly motor vehicles, having a first and second brake system and brake cylinder means at each of the front and rear wheels associated with a respective one of both of said brake systems, comprising brake-actuating means, first pressure-medium means providing a pressure medium associated with said first brake systems, second pressure-medium means providing a pressure medium associated with said second brake system, brake valve means operatively connected with said first pressure medium means, first means operatively connecting said brake valve means with the brake cylinder means of the front and rear wheels of said first brake system to controllably transmit the pressure medium from said first pressure-medium means to the wheel brake cylinder means of both the front and rear wheels of said first brake system including shut-off valve means in the connection leading to the brake cylinder means of the rear wheels of said first brake system, master cylinder means operatively connected with said actuating means, second means operatively connecting the second pressure-medium means with the brake cylinder means of only one group of wheels of the second brake system including auxiliary valve means for selectively controlling the flow of the pressure medium in said second connecting means, means automatically controlling the closure of said shut-off valve means in the absence of a pressure medium in the connection between said second pressure-medium means and said auxiliary valve means, and third means operatively connecting said master cylinder means, on the one hand, directly with the brake cylinder means of only the other group of wheels of said second brake system to directly transmit thereto the actuating force produced in said master cylinder means and, on the other, with said auxiliary valve means to selectively actuate said auxiliary valve means by the hydraulic pressure produced in said master cylinder means to as to transmit the pressure medium from said second pressure medium means to the brake cylinder means of said one group of wheels in the pressure of a hydraulic pressure produced by said master cylinder means, said pressure limit valve means and said shut-off valve means cooperating with the same disconnecting means in the form of a single ball-type check valve.

15. In a brake installation for vehicles, particularly motor vehicles, which includes two brake systems each having brake cylinder means at each wheel, pressure-medium means effectively providing a pressure medium and associated with said brake systems, brake valve means operatively associated with the brake cylinder means of the first brake system, master cylinder means hydraulically connected with the brake cylinder means of the second brake system, and actuating means operatively connected with said brake valve means and said master cylinder means, the improvement essentially consisting of first means operatively connecting said brake valve means with the brake cylinder means of said first brake system in such a manner that said brake valve means upon actuation thereof by said actuating means controllably transmits the pressure medium from said pressure medium means to the wheel brake cylinder means of said first brake system, second means operatively connecting said master cylinder means with the brake cylinder means of the second brake system to effectively transmit the actuating force in the form of a pressure medium produced within said master cylinder means hydraulically to the brake cylinder means of the second brake system, pressure limit valve means in the connection leading to the rear wheels of one brake system for effectively limiting the pressure of the respective pressure medium, shut-off valve means in the connection of one of said brake systems leading to the brake cylinder means of the rear wheels thereof, and means for automatically closing said shut-off valve in the absence of a pressure medium from said pressure-medium means.

16. In a brake installation for vehicles, particularly motor vehicles, which includes two brake systems each having brake cylinder means at each wheel, pressure-medium means effectively providing a pressure medium and associated with said brake systems, brake valve means operatively associated with the brake cylinder means of the first brake system, master cylinder means hydraulically connected with the brake cylinder means of the second brake system, and actuating means operatively connected with said brake valve means and said master cylinder means, the improvement essentially consisting of first means operatively connecting said brake valve means with the brake cylinder means of said first brake system in such a manner that said brake valve means upon actuation thereof by said actuating means controllably transmits the pressure medium from said pressure medium means to the wheel brake cylinder means of said first brake system, second means operatively connecting said master cylinder means with the brake cylinder means of the second brake system to effectively transmit the actuating force in the form of a pressure medium produced within said master cylinder means hydraulically to the brake cylinder means of the second brake system, pressure limit valve means in the connection leading to the rear wheels of one brake system for effectively limiting the pressure of the respective pressure medium, shut-off valve means in the connection of one of said brake systems leading to the brake cylinder means of the rear wheels thereof, means for automatically closing said shut-off valve in the absence of a pressure medium from said pressure-medium means, and common disconnecting means operatively associated with both said pressure limit valve means and said shut-off valve means.

17. A brake installation for vehicles, particularly motor vehicles, having a first and second brake system and brake cylinder means at each of the front and rear wheels associated with a respective one of both of said brake systems, comprising brake-actuating means including scale-beam means operatively connected therewith, first pressure-medium means operatively associated with said first brake system, second pressure-medium means operatively associated with said second brake system, brake valve means operatively connected with said first pressure-medium means, first connecting means directly and operatively connecting said brake valve means with the brake cylinder means of the front and rear wheels of said first brake system to controllably transmit the pressure medium from said first pressure-medium means to the wheel brake cylinder means of both the front and rear wheels of said first brake system including adjustable pressure limit valve means in the connection between said brake valve means and the brake cylinder means of the rear wheels of said first brake system for limiting the pressure of the pressure medium transmitted from said first pressure medium means to said last-mentioned brake cylinder means and means automatically adjusting the maximum pressure limit in said pressure limit valve means in response to the load on the rear wheels, shut-off valve means also connected in said last-mentioned connection which is operable to automatically close said last-mentioned connection in case of failure of pressure medium in the output of said second pressure-medium means, master cylinder means, said scale-beam means being operatively connected near the two ends thereof with said brake valve means and with said master cylinder means, second connecting means operatively connecting the second pressure-medium means with the brake cylinder means of only the front wheels of the second brake system including auxiliary valve means for selectively controlling the flow of the pressure medium in said second connecting means, and third connecting means operatively connecting said master cylinder means, on the one hand, directly with the brake cylinder means of only the rear wheels of said second brake system to directly transmit the actuating force produced in said master cylinder means to the brake cylinder means of only the rear wheels and, on the other, with said auxiliary valve means to selectively actuate said auxiliary valve means by the hydraulic pressure produced in said master cylinder means so as to transmit the pressure medium from said second pressure-medium means to the brake cylinder means of the front wheels of said second brake system in the presence of a predetermined magnitude of said hydraulic pressure, said auxiliary valve means including a piston slide valve member operable to control the supply and discharge of the pressure medium from said second pressure-medium means to and from a space disposed in front of one end face of said piston slide valve member, said last-mentioned space being in communication with the brake cylinder means of the front wheels of said second brake system, and the other end face of said piston slide valve member being acted upon by the hydraulic pressure medium derived from said master cylinder means, said shut-off valve means being controlled by a piston slide valve member which is pressed in the opening position thereof against an abutment by the pressure medium from said second pressure-medium means and which is loaded in the closing position thereof by the pressure medium in the connection of said first brake system leading to the brake cylinder means of the rear wheels.

18. A brake installation for vehicles, particularly motor vehicles, having a first and second brake system and brake cylinder means at each of the front and rear wheels associated with a respective one of both of said brake systems, comprising brake-actuating means including scale-beam means operatively connected therewith, first pressure-medium means associated with said first brake system, second pressure means associated with said second brake system, brake valve means operatively connected with said scale-beam means, first connecting means directly and operatively connecting said brake valve means with the brake cylinder means of the front and rear wheels of said first brake system to controllably transmit the pressure medium from said first pressure-medium means to the wheel brake cylinder means of both the front and rear wheels of said first brake system including pressure limit valve means and shut-off valve means in the connection leading to the brake cylinder means of the rear wheels of said first brake system, a first piston slide valve member for controlling closing of said pressure limit valve means, a second hollow piston slide valve member for controlling closing of said shut-off valve means, master cylinder means, said scale-beam means being operatively connected near the two ends thereof with said brake valve means and with said master cylinder means, second connecting means operatively connecting the second pressure-medium means with the brake cylinder means of only one group of wheels of the second brake system including auxiliary valve means for selectively controlling the flow of the pressure medium in said second connecting means, and third connecting means operatively connecting said master cylinder means, on the one hand, directly with the brake cylinder means of only the other group of wheels of said second brake system to directly transmit the actuating force produced in said master cylinder means to the brake cylinder means of only said other group of wheels and, on the other, with said auxiliary valve means to selectively actuate said auxiliary valve means by the hydraulic pressure produced in said master cylinder means so as to transmit the pressure medium from said second pressure-medium means to the brake cylinder means of said one group of wheels in the presence of said hydraulic pressure, said piston slide valve members being arranged axially one behind the other, the pressure medium from said brake valve means flowing through the hollow piston slide valve member of said shut-off valve means, an outlet bore being provided at one end face of said hollow piston slide valve member terminating in the space between said two slide valve members, said space being connected with the brake cylinder means of the rear wheels of said first brake system, a spring-loaded ball-type check valve for said outlet bore, and a pin at the slide valve member of said auxiliary valve means for retaining said check valve in the open position thereof with a brake installation at normal operating readiness and below the maximum pressure determined by said pressure limit valve means.

References Cited by the Examiner

UNITED STATES PATENTS

| | | | |
|---|---|---|---|
| 2,150,576 | 3/39 | Bell | 303—22 X |
| 2,219,786 | 10/40 | Olley | 188—152 |
| 2,324,007 | 7/43 | MacPherson | 188—152 |
| 2,918,148 | 12/59 | Uhlenhaut et al. | 188—152 |
| 2,919,161 | 12/59 | Hammer | 303—22 X |
| 2,934,381 | 4/60 | Hill | 303—22 X |
| 2,940,796 | 6/60 | Ortman et al. | 303—40 X |
| 2,950,147 | 8/60 | Neubeck | 303—40 X |
| 3,006,694 | 10/61 | Valentine et al. | 303—22 |
| 3,018,139 | 1/62 | Stelzer | 303—22 X |
| 3,047,341 | 7/62 | Alfieri | 188—152 |

FOREIGN PATENTS

| | | |
|---|---|---|
| 216,858 | 1/42 | Switzerland. |
| 454,508 | 6/50 | Italy. |

EUGENE G. BOTZ, *Primary Examiner.*

ARTHUR L. LA POINT, *Examiner.*